(12) United States Patent
Dörksen et al.

(10) Patent No.: US 12,446,557 B2
(45) Date of Patent: Oct. 21, 2025

(54) DEVICE AND METHOD FOR IN-OVO DETERMINATION OF THE SEX OF A FERTILISED BIRD EGG

(71) Applicant: TECHNISCHE HOCHSCHULE OSTWESTFALEN-LIPPE UNIVERSITY OF APPLIED SCIENCES AND ARTS, Lemgo (DE)

(72) Inventors: Helene Dörksen, Kaltenkirchen (DE); Jürgen Krahl, Lemgo (DE); Jens Staufenbiel, Coburg (DE)

(73) Assignee: TECHNISCHE HOCHSCHULE OSTWESTFALEN-LIPPE UNIVERSITY OF APPLIED SCIENCES AND ARTS, Lemgo (DE)

( * ) Notice: Subject to any disclaimer, the term of this patent is extended or adjusted under 35 U.S.C. 154(b) by 103 days.

(21) Appl. No.: 17/793,325

(22) PCT Filed: Jan. 15, 2021

(86) PCT No.: PCT/EP2021/050806
§ 371 (c)(1),
(2) Date: Jul. 15, 2022

(87) PCT Pub. No.: WO2021/144420
PCT Pub. Date: Jul. 22, 2021

(65) Prior Publication Data
US 2023/0081662 A1    Mar. 16, 2023

(30) Foreign Application Priority Data
Jan. 15, 2020 (DE) .................... 10 2020 000 214.5

(51) Int. Cl.
*A01K 45/00* (2006.01)
*G01J 3/02* (2006.01)
(Continued)

(52) U.S. Cl.
CPC .......... *A01K 45/007* (2013.01); *G01J 3/0218* (2013.01); *G01J 3/0232* (2013.01); *G01J 3/4406* (2013.01);
(Continued)

(58) Field of Classification Search
CPC .... A01K 45/007; G01J 3/0218; G01J 3/0232; G01J 3/4406; G01N 21/6408;
(Continued)

(56) References Cited

U.S. PATENT DOCUMENTS 7,950,349 B1    5/2011 Rollins
8,364,247 B2    1/2013 Opitz et al.
(Continued)

FOREIGN PATENT DOCUMENTS

CN    109444106 A   *  3/2019   ............ B01J 19/123
CN    108983051 B      2/2021
(Continued)

OTHER PUBLICATIONS

English Translation of Ling et al. CN109444106A Description (Year: 2019).*
(Continued)

*Primary Examiner* — Tarifur R Chowdhury
*Assistant Examiner* — Akbar H. Rizvi
(74) *Attorney, Agent, or Firm* — REISING ETHINGTON, P.C.

(57) ABSTRACT

A device for the in-ovo determination of the sex of a fertilized bird egg, having a light source for emitting excitation radiation for exciting fluorescence in a region inside the bird egg, a spectroscopic apparatus for analyzing, in a temporally and/or spectrally-resolved manner, fluorescence radiation emitted from the region inside the bird egg, an evaluation unit for determining the sex from the data determined by means of the spectro-scopic apparatus and a
(Continued)

measuring head for jointly transmitting the excitation radiation into the bird egg and receiving the fluorescence radiation from the bird egg. The measuring head has an optical fibre system with a head end for transmitting the excitation radiation and receiving the fluorescence radiation.

8 Claims, 2 Drawing Sheets

(51) Int. Cl.
    *G01J 3/44*           (2006.01)
    *G01N 21/64*         (2006.01)
    *G01N 33/08*         (2006.01)

(52) U.S. Cl.
    CPC ..... *G01N 21/6408* (2013.01); *G01N 21/6486* (2013.01); *G01N 33/085* (2013.01); *G01N 2021/6421* (2013.01); *G01N 2021/6484* (2013.01)

(58) Field of Classification Search
    CPC ............. G01N 21/6486; G01N 33/085; G01N 2021/6421; G01N 2021/6484
    See application file for complete search history.

(56) References Cited

U.S. PATENT DOCUMENTS

| | | | |
|---|---|---|---|
| 8,624,190 | B2 | 1/2014 | Steiner et al. |
| 9,804,092 | B2 | 10/2017 | Zeng et al. |
| 9,937,357 | B2 | 4/2018 | Szasz et al. |
| 10,852,284 | B2 | 12/2020 | Steiner et al. |
| 10,914,684 | B2 | 2/2021 | Zhou et al. |
| 12,198,333 | B2 | 1/2025 | Kwon |
| 2003/0202180 | A1* | 10/2003 | Gobel ................. G01N 21/474 356/325 |
| 2004/0162489 | A1 | 8/2004 | Richards-Kortum et al. |
| 2012/0058052 | A1 | 3/2012 | Decuypere et al. |
| 2012/0318981 | A1* | 12/2012 | Steiner ............... G01N 21/3563 250/341.2 |
| 2014/0293277 | A1 | 10/2014 | Subbiah et al. |
| 2019/0383782 | A1* | 12/2019 | Steiner .................. A01K 45/00 |
| 2020/0408693 | A1 | 12/2020 | Zhou et al. |
| 2021/0382290 | A1* | 12/2021 | Rigneault .......... A61B 1/00172 |
| 2023/0081662 | A1 | 3/2023 | Dörksen et al. |
| 2024/0407341 | A1 | 12/2024 | Steiner et al. |
| 2025/0216371 | A1 | 7/2025 | Dörksen et al. |

FOREIGN PATENT DOCUMENTS

| | | |
|---|---|---|
| CN | 113850174 A | 12/2021 |
| DE | 60208823 T2 | 8/2006 |
| DE | 102010006161 B3 | 1/2011 |
| DE | 102016004051 B3 | 7/2017 |
| DE | 102020000214 A1 | 7/2021 |
| DE | 102021127696 B3 | 3/2023 |
| DE | 102022107397 A1 | 10/2023 |
| EP | 2336751 A1 | 6/2011 |
| JP | 6127142 B2 | 5/2017 |
| KR | 20230023872 A | 2/2023 |
| WO | WO2017174337 A1 | 10/2017 |
| WO | WO2018001437 A1 | 1/2018 |
| WO | WO2020098243 A1 | 5/2020 |
| WO | WO2021144420 A1 | 7/2021 |
| WO | WO2023161532 A1 | 8/2023 |
| WO | WO2023240122 A1 | 12/2023 |

OTHER PUBLICATIONS

International Search Report for International Application No. PCT/EP2021/050806 dated Mar. 31, 2021 (3 pages).
English Translation of International Search Report for International Application No. PCT/EP2021/050806 dated Mar. 31, 2021 (2 pages).
Galli, Roberta et al., In ovo sexing of chicken eggs by fluorescence spectroscopy, Analytical Bioanalytical Chemistry, Dec. 14, 2016, pp. 1185-1194, vol. 409, No. 5.
Perri, A. et al., Time- and frequency-resolved fluorescence with a single TCSPC detector via a Fourier-transform approach, Optics express, Feb. 5, 2018, vol. 26, No. 3 (10 pages).
Japanese Office Action for Japanese Application No. 2022-543438 dated Oct. 10, 2023 (3 pages).
English Translation of Japanese Office Action for Japanese Application No. 2022-543438 dated Oct. 10, 2023 (3 pages).
Galli et al., In ovo sexing of chicken eggs by fluorescence spectroscopy, Anal Bioanal Chem, Dec. 14, 2016, vol. 409, pp. 1185-1194 (11 pages).
International Search Report for International Application No. PCT/EP2023/057650 dated Jun. 7, 2023 (20 pages).
English Translation of International Search Report for International Application No. PCT/EP2023/057650 dated Jun. 7, 2023 (20 pages).
Shcheslavskiy V I et al: "Multiparametric 1-12 Time-Correlated Single Photon Counting Luminescence Microscopy." Biochemistry (Moscow), Pleiades Publishing, Moscow, vol. 84, No. 1, Apr. 19, 2019, pp. 51-68, XP036761719, ISSN: 0006-2979, DOI: 10.1134/S0006297919140049.
Canadian Office Action for CA Application No. 3,164,523 dated May 15, 2024 (5 pages).
Rajapaksha, Nipuna et al., Supervised Machine Learning Algorithm Selection for Condition Monitoring of Induction Motors, Proceedings : 2021 IEEE southern power electronics conference (SPEC), Dec. 6-9, 2021. 10 S.—ISBN 978-1-6654-3623-6.
German Office Action for German Application No. 10 2023 122 800.5 dated Apr. 26, 2024 (4 pages).
English Translation of German Office Action for German Application No. 10 2023 122 800.5 dated Apr. 26, 2024 (4 pages).
Xingyue Zhu et al.; A new method to measure fat content in coconut milk based on Y-type optic fiber system; Elsevier; Optik 125 (2014) pp. 6172-6178 (8 pages).
Helene Dörksen et al.; Combinatorial Refinement of Feature Weighting for Linear Classification; 2014 IEEE Emerging Technology and Factory Automation (ETFA); Sep. 16, 2014 (7 pages).
Helene Dörksen et al.; Linear Classification of Badly Conditioned Data; 2018 IEEE 23rd International Conference on Emerging Technologies and Factory Automation (ETFA), IEEE, vol. 1; Sep. 4, 2018; pp. 654-660 (7 pages).
Christopher James Langmead et al.; A Maximum Entropy Algorithm for Rhythmic Analysis of Genome-Wide Expression Patterns; Proceed. Bioinformatics Conf., Stanford, CA, United States, ed. by IEEE Computer Society, Los Alamitos, Calif., Aug. 14-16, 2002, pp. 237-245, ISBN: 0-7695-1653-X; (9 pages).
German Office Action for German Application No. 10 2024 114 348.7 dated Apr. 1, 2025 (6 pages).
International Search Report for International Application No. PCT/EP2024/072776 dated Nov. 15, 2024 (16 pages).
McGown L B et al: "Total Lifetime Distribution Analysis for Fluorescence Fingerprinting and Characterization", Applied Spectroscopy, the Society for Applied Spectroscopy, Baltimore, US, Bd. 49, Nr. 1, Jan. 1, 1995, pp. 60-66, XP000486663,ISSN: 0003-7028, DOI: 10.1366/0003702953963427.
Shen C-H: "Feature Extraction and Classification of Heart Murmurs Based on Acoustic Qualities", IRBM, Elsevier, Amsterdam, NL, Bd. 43, Nr. 5, Feb. 18, 2021, pp. 470-478, XP087182741, ISSN: 1959-0318, DOI: 10.1016/J.IRBM.2021.02.002.
International Search Report for International Application No. PCT/EP2025/064140 dated Jul. 14, 2025 (18 pages).

\* cited by examiner

DEVICE AND METHOD FOR IN-OVO DETERMINATION OF THE SEX OF A FERTILISED BIRD EGG

INTRODUCTION

The disclosure relates to a device for in-ovo determination of the sex of a fertilised bird egg.

The disclosure further relates to a corresponding measuring head for a device for in-ovo determination of the sex of a fertilised bird egg.

The disclosure further relates to a method for in-ovo determination of the sex of a fertilised bird egg.

Currently, there is an effort to be able to determine the sex of a chick already in the fertilised chicken egg.

In the bird egg, different fluorophores, in particular hormones, develop during growth in male and female chicks. Due to their complex structure, the corresponding molecules have an unpredictable fluorescence capacity. In fluorescence electron transitions from the excited to the ground state are observed. This process is time-dependent.

Document DE 10 2016 004 051 B3 describes a device and a method for optical in-ovo determination of the sex of a fertilised bird egg. The method comprises the steps of: (a) emitting excitation radiation for exciting fluorescence in a region inside the bird egg by means of a light source, (b) fluorescence analysis, in a temporally and/or spectrally-resolved manner, of fluorescence radiation emitted from the region inside the bird egg by means of a spectroscopic apparatus, and (c) determinating the sex from the data obtained by means of the spectroscopic apparatus. By means of a measuring head comprising a beam splitter and optics, the excitation radiation is emitted into the bird egg and jointly therewith the fluorescence radiation is received from the bird egg through a single hole in the eggshell of the bird egg. However, for the method described therein, the hole must be relatively large, resulting in the risk of germ contamination.

SUMMARY

It is therefore an object per an embodiment to provide a device and a method in which in-ovo determination of the sex can be carried out precisely and safely with a significantly lower risk of germ contamination.

In the device according to an embodiment for in-ovo determination of the sex of a fertilised bird egg, comprising (i) a light source for emitting excitation radiation for exciting fluorescence in a region inside the bird egg, (ii) a spectroscopic apparatus for analyzing, in a temporally and/or spectrally-resolved manner, of fluorescence radiation emitted from the region inside the bird egg, (iii) an evaluation unit for determining the sex from the data determined by means of the spectroscopic apparatus, and (iv) a measuring head for jointly emitting the excitation radiation into the bird egg and receiving the fluorescence radiation from the bird egg, preferably through a single hole in the eggshell of the bird egg, it is provided that the measuring head comprises a light guide system with a head end for emitting the excitation radiation and receiving the fluorescence radiation. In this way, the emission and reception of corresponding radiation can be realized via a very small hole. In particular, the aforementioned device can be used to receive the fluorescence radiation on the eggshell.

The hole then preferably, per an embodiment, has a hole size with a dimension or diameter D in the range of 0.5 mm s D s 3 mm.

According to an embodiment, it is provided that the light guide system is a Y-shaped light guide system with two light guide strands, which are brought together on the side of the head end.

Here, in this embodiment, it is provided that the light guide strands are formed as light guide bundles whose individual light guides are intertwined on the side of the head end. This means in the sense of an embodiment that the light guides are intertwined, for example twisted. Such an intertwining could also be called interlacing with each other, wherein no mandatory regularity is provided in this braiding.

According to another embodiment, it is provided that the region inside the bird egg is a germinal disc region and/or a bloodstream region and/or a region of embryonic structures. Which of these regions is selected depends in particular on the stage of development in the fertilised bird egg.

According to still another embodiment, the spectroscopic apparatus is an apparatus for analyzing fluorescence radiation in a temporally-resolved manner or for analyzing fluorescence radiation in a temporally and spectrally-resolved manner. If the frequencies from which sex information can be obtained are known, an analysis in a spectrally-resolved manner is often no longer necessary.

According to still another embodiment, the light source is a pulsed laser light source. Preferably, per an embodiment, it may be provided that the light source comprises a laser for generating laser pulses. Further, it may be provided that a frequency multiplying device is connected downstream of the laser for generating laser pulses, for example a frequency doubler, frequency tripler or a frequency quadrupler device.

According to still another embodiment, the excitation radiation is a radiation having a wavelength in a range from greater than or equal to 100 nm to less than or equal to 380 nm, preferably greater than or equal to 200 nm to less than or equal to 280 nm, for example a wavelength of 266 nm.

According to still another embodiment, the excitation radiation is pulsed and has a pulse length in a range from greater than or equal to 0.1 ns to less than or equal to 1 µs, preferably greater than or equal to 1 to less than or equal to 200 ns, particularly preferably greater than or equal to 2 ns to less than or equal to 20 ns.

According to still another embodiment, the excitation radiation is pulsed and has a pulse length in the femtosecond or picosecond range.

According to still another embodiment, the spectroscopic apparatus comprises a spectrometer (a spectrograph), wherein the spectrometer is preferably arranged to receive fluorescence radiation having a wavelength in a range of greater than or equal to 200 nm to less than or equal to 600 nm.

Preferably, per an embodiment, it can be provided that the spectroscopic apparatus comprises a multichannel detector and a shutter connected between the spectrometer and the multichannel detector. It may further be that the laser on the one hand and the multichannel detector and the shutter on the other hand are coupled via a Q-switch.

According to another embodiment, it is provided that the evaluation unit is an evaluation unit based on machine learning. Machine learning is (according to the current Wikipedia entry) a generic term for the "artificial" generation of knowledge from experience: an artificial system learns from examples and can generalize them after the learning phase is completed. To this end, algorithms of machine learning build a statistical model based on training data.

According to another embodiment, it is provided that the evaluation unit is an evaluation unit based on so-called feature engineering. Feature engineering is a form of data processing and describes the selection and preparation of features, which are used for creating a machine learning model.

Preferably, per an embodiment, it can be provided that the evaluation unit is configured to take into account the central moments of 2nd order (standard deviation) and 3rd order (skewness) during feature engineering. It may be provided that the evaluation unit is configured to form features from a data matrix. Here, the evaluation unit can be configured to form features both row-by-row and column-by-column. Preferably, per an embodiment, it can be provided that the evaluation unit is configured for this purpose to eliminate features with weak separating properties, preferably with the aid of Fischer's linear discriminant analysis (LDA). Preferably, per an embodiment, it can be provided that the evaluation unit is configured to determine the accuracy of a classifier, wherein it can preferably be configured for the method of 5×2 Kross validation.

In the measuring head according to an embodiment for a device for in-ovo determination of the sex of a fertilised bird egg, which is configured for jointly emitting excitation radiation into the bird egg and receiving fluorescence radiation from the bird egg, preferably through a single hole in an eggshell of the bird egg, per an embodiment, it is provided that the measuring head comprises a light guide system having a head end for emitting the excitation radiation and receiving the fluorescence radiation. The corresponding device for in-ovo determination of the sex of a fertilised bird egg is in particular a device mentioned above.

In the method according to an embodiment for in-ovo sex determination of a fertilised bird egg, comprising the steps of
  (a) emitting excitation radiation for exciting fluorescence in a region inside the bird egg by means of a light source,
  (b) fluorescence analysis, in a temporally and/or spectrally-resolved manner, of fluorescence radiation emitted from the region inside the bird egg by means of a spectroscopic apparatus, and
  (c) determining the sex from the data determined by means of the spectroscopic apparatus, wherein by means of a measuring head, preferably, per an embodiment, through a single hole in the eggshell of the bird egg, the excitation radiation emitted into the bird egg and jointly therewith the fluorescence radiation is received from the bird egg, it is provided that the measuring head comprises a light guide system and the emission of the excitation radiation into the bird egg and the reception of the fluorescence radiation from the bird egg are implemented via a head end of the light guide system which is moved close to the bird egg, preferably to the hole.

Thus, according to an embodiment of the method, the excitation radiation is emitted into the bird egg and the fluorescence radiation is received from the bird egg through a single hole in the eggshell by means of the measuring head.

The implementation of the method is usually preceded by a step of creating the hole in the eggshell. Here, in particular, it is intended that the hole is created without opening an egg skin underlying the eggshell. The fluorescence measurement can be carried out through this egg skin or egg skins.

According to an embodiment of the method, it may be provided that by means of the measuring head the excitation radiation is emitted into the bird egg and the fluorescence radiation is received from the bird egg without the eggshell having a hole. The excitation radiation and the fluorescence radiation thus respectively penetrate the eggshell. Surprisingly, it has been found that the method described above nevertheless allows an in-ovo determination of the sex of a fertilised bird egg.

According to a further embodiment of the method, it can be provided that the region inside the bird egg is removed from the egg and the method steps (a), (b) and (c) are carried out accordingly outside the egg.

This embodiment of the method for in-ovo determination of the sex of a fertilised bird egg comprises the steps:
  Taking a sample from inside the bird egg,
  (a) emitting excitation radiation for exciting fluorescence in a region of the sample from the inside of the bird egg by means of a light source,
  (b) fluorescence analysis of fluorescence radiation emitted from the region of the sample from inside the bird egg by means of a spectroscopic apparatus in a temporally and/or spectrally-resolved manner; and
  (c) determining the sex from the data obtained by means of the spectroscopic apparatus, wherein by means of a measuring head the excitation radiation is emitted into the sample from the inside the bird egg and jointly therewith the fluorescence radiation is received from the sample from the inside of the bird egg, wherein the measuring head comprises a light guide system and the emission of the excitation radiation into the sample from the inside of the bird egg and the reception of the fluorescence radiation from the sample from the inside of the bird egg are effected via a head end of the light guide system which is moved close to the sample.

BRIEF DESCRIPTION OF THE FIGURES

In the following, the invention is explained with reference to the accompanying drawings based on exemplary embodiments, wherein the features shown below may each individually or in combination represent an aspect of the invention. In the drawings.

DETAILED DESCRIPTION

Figure 1:
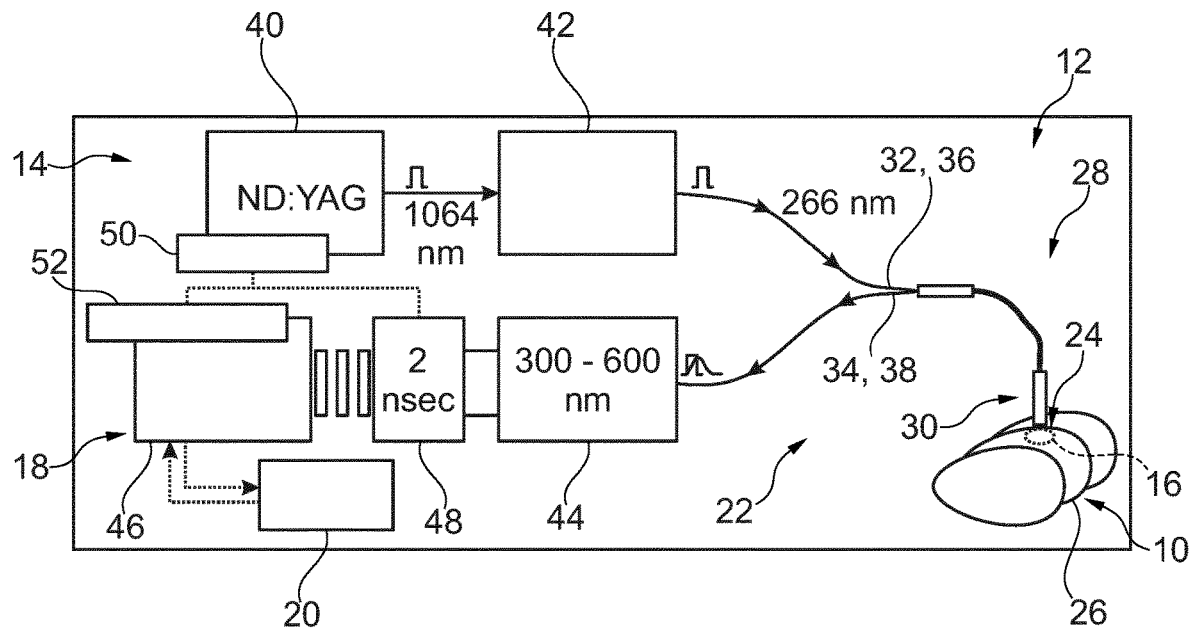
FIG. 1 is a structure with a bird egg and a device for in-ovo determination of the sex of said bird egg according to an embodiment.

FIG. 1 shows a schematic representation of a measurement setup with several bird eggs 10 and a device 12 for optical in-ovo determination of the sex of one of these bird eggs 10. The device 12 comprises a light source 14 for emitting excitation radiation in the form of light pulses for exciting fluorescence in a region 16 inside the bird egg 10, a spectroscopic apparatus 18 for analyzing fluorescence radiation emitted from the region inside the bird egg 10 in a temporally and/or spectrally-resolved manner, a computer-based evaluation unit 20 for determining the sex from the data determined by the spectroscopic apparatus 18 and a measuring head 22 for jointly emitting the excitation radiation into the bird egg 10 and receiving the fluorescence radiation from the bird egg 10 through a single hole 24 in the eggshell 26 of the bird egg 10. The measuring head 22 comprises a light guide system 28 having a head end 30 for emitting the excitation radiation and receiving the fluorescence radiation. This head end 30 is also the head end of the measuring head 22 and is held against the hole 24 in the eggshell 26 for measuring.

The light guide system 28 of the measuring head 22 is Y-shaped and comprises two light guide strands 32, 34, one light guide strand 32 for the excitation radiation and one light guide strand 34 for the fluorescence radiation. The two light guide strands 32, 34 are brought together on the side of the head end 30. The light guide strands 32, 34 are each formed as light guide bundles 36, 38 whose individual light guides (not shown in detail) are intertwined on the side of the head end 30.

In the example shown, the light source 14 comprises a laser 40 for generating laser pulses and a frequency doubler device 42 connected downstream of the laser 40. Thus, the light source 14 is a pulsed laser light source.

In the example shown, the spectroscopic apparatus 18 comprises a spectrometer (a spectrograph) 44, a multichannel detector 46 configured as an ICCD camera, and a shutter 48 interconnected between the spectrometer 44 and the multichannel detector 46. A coupling between the laser 40 on the one hand and the multichannel detector 46 and the shutter 48 on the other hand is implemented via a so-called Q-switch 50 and a pulse generator 52 on the detector side. A computer serves as the evaluation unit 20.

In the example, the laser is an ND:YAG laser with a wavelength of 1064 nm. By means of frequency doubling, a wavelength of 266 nm is achieved for the excitation radiation. The laser-induced fluorescence signals are recorded by the multi-channel detector ICCD camera 46. The fiber bundle of the light guide system 28 not only guides the laser beam onto the sample, i.e. the inside of the bird egg 10, but also guides the generated fluorescence light to the detector 46.

During the measurement, the complete spectrum is recorded at any time. This allows ZLIF measurements to be made directly on surfaces. The emission range is between 300 and 600 nm.

The crucial region inside the bird egg 10 where fluorescence radiation is excited is a germinal disc region, a bloodstream region and/or an region of embryonic structures.

An example of in-ovo determination of the sex of 3- to 6-day-old incubated chicken eggs by temporally-resolved fluorescence spectroscopy (ZLIF) by use of a device 12 is discussed below.

In all examinations, the orientation of the region 16 of the embryonic structures (in short, of the embryo) to the measurement head 22 is crucial. The position of the embryo can be determined by candling. This example relates to the examinations of 3- or 6-day-old incubated eggs. By use of the measuring system, chicken eggs can be examined in three ways:

1. measurement through the eggshell 26;
2. measurement without eggshell 26 through the intact egg skin;
3. measurement directly on the embryo.

For the examinations of 3- or 6-day-old incubated eggs 10, the chicken eggs were aligned and then measured from above through the eggshell 26. In alternative two, the eggshell 26 was carefully removed so that a measurement could be made through the intact egg skin. In these two types of studies, the alignment of the embryo cannot be ensured without error. For this reason, in the third alternative, the egg skin was removed and a measurement was repeated directly on the embryo and on the blood veins.

The ZLIF measurements can be taken as a function of equidistantly increasing times $\tau_1, \ldots, \tau_n$ for a fixed n as series of values or equivalently as signal series or vectors $a=(a_1, \ldots, a_n) \in \mathbb{R}^n$. Since at each time $\tau_j$, $j=1, \ldots, n$ the spectrum is recorded, it is possible to define the value series as (mathematical) matrices $A \in \mathbb{R}^{m \times n}$:

$$A = \begin{pmatrix} a_{11} & a_{12} & \ldots & a_{1n} \\ a_{21} & a_{22} & \ldots & a_{2n} \\ \vdots & \vdots & \ldots & \vdots \\ a_{m1} & a_{m2} & \ldots & a_{mn} \end{pmatrix}$$

wherein the columns $(a_{1j}, \ldots, a_{mj})^T \in \mathbb{R}^{mj}$ of A are the above spectra at time $\tau_j$. Thus, for each individual bird egg, the result of the ZLIF measurement corresponds to a matrix of associated measurement values. Depending on the type of the ZLIF measurement as well as the sex of 3- or 6-day-old incubated eggs, such matrices are assigned to one of the following classes:

{Sex (m/f), Day (3/6), type (without eggshell, through int. egg skin, embryo)}.

Here, for error-free assignment of the sexes, the samples were analysed from the embryo in the Gene Laboratory by quantitative real-time polymerase chain reaction (qPCR) and corresponding primer sets.

Machine learning (ML) methods can be used to learn a system which allows a direct determination of sex from ZLIF measurements. These are the classical WIL methods as well as the own NIL relevant scientific publications of the inventors involved in this patent application.

Classes of different sexes of yet same incubation periods and same types are of interest for learning the system. This is not a limitation, since usually both the incubation periods and the type of measurement are known. The reasoning leads to the binary classification problem for the two classes:

$C_X$ (for female) and $C_Y$ (for male).

For a set of chicken eggs of the same incubation periods, ZLIF measurements of the same type are carried out. Furthermore, the chicken eggs are assigned by qPCR to one of the classes $C_X$ or $C_Y$. Thus we obtain objects with $A_X \in C_X$ or $A_Y \in C_Y$ with the structures corresponding to matrices A described above.

Figure 2:
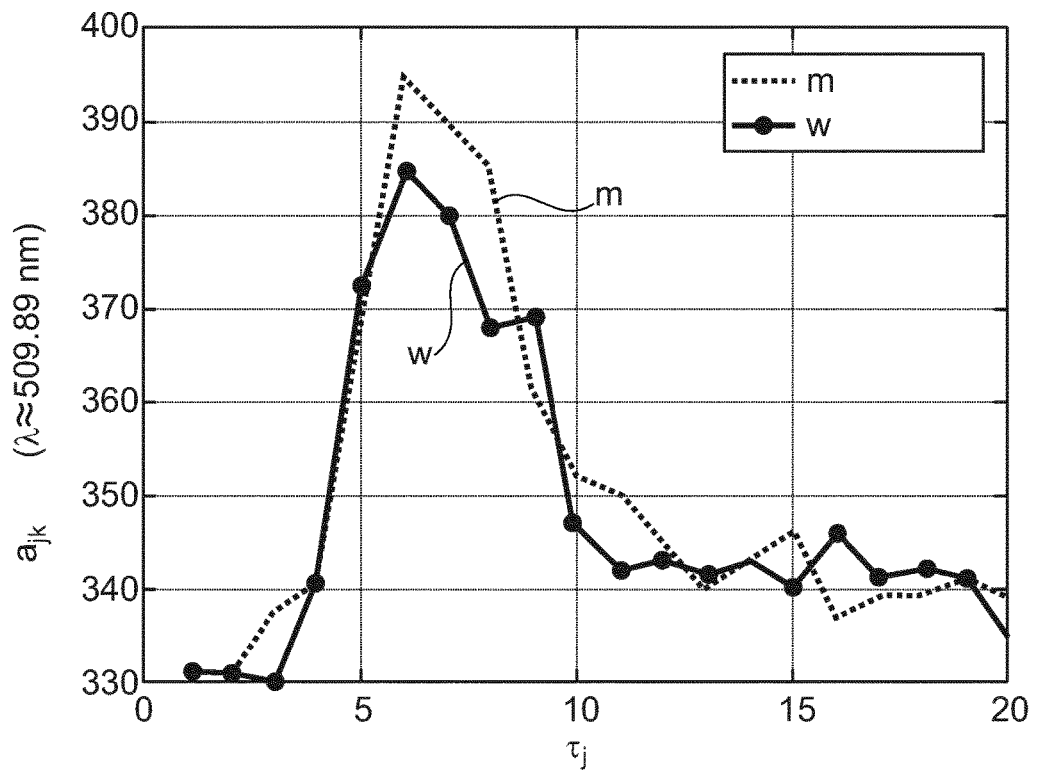
FIG. 2 is a representation of the corresponding spectra representing values $a_{jk}$ of $(a_{j1}, \ldots, a_{jn})$ corresponding to the wavelength $\lambda=500.89$ nm for a male or female chicken egg.

For learning the system for direct sex determination, the following feature extraction from object A is carried out. Here, it is assumed that the values of individual rows of A, i.e., $(a_{j1}, \ldots, a_{jn})$, $j=1, \ldots, m$ are described by statistical distributions. Physically, the rows mean the temporally-resolved measurements for certain fixed wavelengths. FIG. 2 represents the example of a row $(a_{j1}, \ldots, a_{jn})$ for a fixed j corresponding to the wavelength $\lambda=500.89$ nm for the measurement on a male (m) or female (w) chicken egg. It can be seen from the plot that by using different forms of the measurement series, the classification is possible in principle.

Central moments of $a_j := (a_{j1}, \ldots, a_{jn})$, $j = 1, \ldots, m$ describe statistical properties of $a_j$. The first three moments are mean value μ, standard deviation δ and skewness S:

$$\mu(a_j) = \frac{1}{n}\sum_{k=1}^{n} a_{jk}, \quad \sigma(a_j) = \sqrt{\frac{1}{n}\sum_{k=1}^{n}(a_{jk} - \mu(a_j))^2},$$

$$S(a_j) = \frac{1}{n}\sum_{k=1}^{n}\left(\frac{a_{jk} - \mu(a_j)}{\sigma}\right)^3.$$

For each object, m features ($a_j$) and m features $S(a_j)$, $j=1, \ldots, m$ are extracted respectively. Thus, the feature vector $f \in \mathbb{R}$ of each object is.

$f = (\sigma(a_1), \ldots, \sigma(a_m), S(a_1), \ldots, S(a_m))$.

To satisfy the accuracy of the classification of $C_X$ and $C_Y$ a feature selection is carried out. Here, by use of "Fisher's Linear Discriminant Analysis" (LDA), the features with weak separating properties are eliminated, since they contribute too little to the classification and may worsen results. The features with strong separating properties are used to construct a classification hyperplane by use of LDA.

Several datasets have been generated to train and validate the system for direct sex determination. For this purpose, a quantity $M_1$ of 12+13 chicken eggs were taken and measurements were carried out. In total there were about 30 chicken eggs, nevertheless the sex by means of qPCR could not be determined for all of them. At a later time, the next ZLIF measurement took place on another quantity $M_2$ of 15+10 chicken eggs. Here there were initially 40 chicken eggs, but as in the first test, the sex could not be determined for all. These two tests should show that the described method is suitable for direct sex determination. At least two measurements are necessary to validate the results.

In the first test with the quantity $M_1$, 12 chicken eggs (6 m+6 w, 3-day-old embryos) as well as 13 chicken eggs (6 m+7 w, 6-day-old first without eggshell through the intact egg skin, then at embryos) were measured with ZLIF. In the second test with the quantity $M_2$ 15 chicken eggs (3 m+12 w, 3-day-old embryos) as well as 18 chicken eggs (14 m+4 w, 6-day-old first without eggshell through the intact egg skin, then on embryos) were measured. On each chicken egg the ZLIF measurements have been repeated 15 times. Thus, each chicken egg provides 15 objects for one of the classes. Table 1 summarizes the two tests with three experiments each.

TABLE 1

Two tests with three experiments each for learning and validating the system. The term #obj. means number of objects.

| | # Obj. m/f (test 1) | # Obj. m/f (test 2) | Days | Type |
|---|---|---|---|---|
| 1 | 90/90 | 45/180 | 3 | Embryo |
| 2 | 90/105 | 210/60 | 6 | Through egg skin |
| 3 | 90/105 | 210/60 | 6 | Embryo |

For the selected temporal resolution, n is 20, the spectrum is equidistantly recorded starting with $\lambda = 00.08$ nm to $\lambda = 596.75$ nm and m=1024. The feature vectors of each object thus correspond to:

$f = (\sigma(a_1), \ldots, \sigma(a_{1024}), S(a_1), \ldots, S(a_{1024}))$ and have the lengths 2·m=2048.

Two scenarios have been tested for learning and validating the system. In the first case, the classes $C_X$ and $C_Y$ consist of the objects from both tests $M_1$ and $M_2$ and for teaching and testing the system, no distinction is made between tests. Thus, in $C_Y$ in experiment 1 there are 135 objects, in experiment 2 there are 300 and in experiment 3 there are also 300 objects. In $C_X$ in experiment 1 there are 270 objects, in experiment 2 there are 165 and in experiment 3 there are 165 objects.

Then, the classes $C_X$ and $C_Y$ have each been randomly subdivided into training objects and test objects. The classifier is designed for the training objects and the accuracy of the classifier is tested on the test objects. The 5×2 cross-validation method is used to determine the accuracy of the classifier. This is an established method for determining the accuracy of a classifier. The idea of the 5×2 cross-validation is to take an equal number of training objects and test objects, so that one can switch the training set to the test set and vice versa. The results of the 5×2 cross-validation provide a reliable mean value for the accuracy. Table 2 lists the results.

TABLE 2

Results of 5 × 2 cross-validation for objects of both tests

| | Experiment | Accuracy (Training) | Accuracy (test) |
|---|---|---|---|
| 1 | 3-day-old, embryo | 88.89% | 84.69% |
| 2 | 6-day-old, through egg skin | 96.46% | 92.27% |
| 3 | 6-day-old, embryo | 96.13% | 90.51% |

Figure 3:
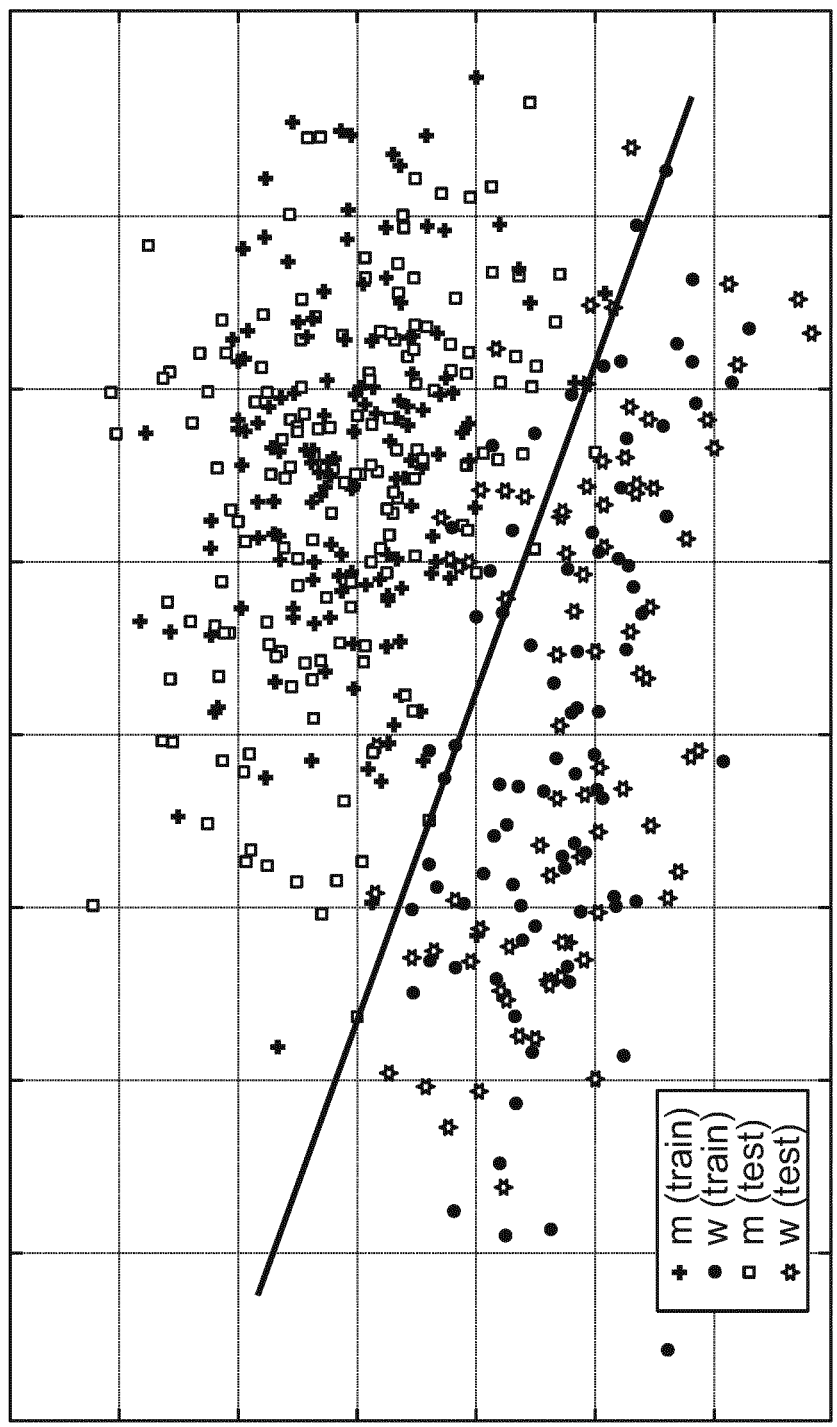
FIG. 3 is the representation of a classifier (black line) for the first scenario and Experiment 2 (6-day, through the egg skin).

FIG. 3 shows the representation of a corresponding classifier (black line) for the first scenario and experiment 2 (6-day-old, through egg skin).

In the second scenario, the tests distinguish between teaching and testing. In the second test, there are more objects than in the first. It is expected here that the more objects are used for training, the more stable the system is. For this reason, the classifier is trained on the objects from experiment 2, and tested on the objects from experiment 1. The results can be found in Table 3 below.

TABLE 2

Results for accuracy during training on objects from $M_2$ and testing on $M_1$.

| | Experiment | Accuracy (Training) | Accuracy (test) |
|---|---|---|---|
| 1 | 3-day-old, embryo | 90.67% | 76.67% |
| 2 | 6-day-old, through egg skin | 95.56% | 89.23% |
| 3 | 6-day-old, embryo | 95.56% | 87.69% |

Conclusion: The experiments carried out show that a direct sex determination is possible in incubated chicken eggs using ZLIF. The incubation periods are between 3 and 6 days. A reliable accuracy between 76.67% and 92.27% can be achieved. This method has a great potential to improve the accuracy. The potentials are based on the optimization of the ZLIF experiment as well as on the optimization of the feature extraction, feature selection and the design of the classifier.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10 bird egg
12 device for in-ovo determination of sex
14 light source
16 region (inside bird egg)
18 spectroscopic apparatus
20 evaluation unit
22 measuring head
24 hole (in eggshell)
26 eggshell
28 light guide system
30 head end
32 light guide strand
34 light guide strand
36 light guide bundle
38 light guide bundle
40 laser
42 frequency doubler device
44 spectrometer
46 multichannel detector
48 shutter
50 Q-Switch
52 pulse generator

The invention claimed is:

1. A device for in-ovo determination of sex of a fertilized bird egg, comprising:
a light source for emitting excitation radiation for exciting fluorescence in a region inside the fertilized bird egg;
a spectroscopic apparatus for analyzing fluorescence radiation emitted from the region inside of the fertilized bird egg in a temporally- and/or spectrally-resolved manner;
an evaluation unit for determining the sex from data determined by means of the spectroscopic apparatus; and
a measuring head for jointly emitting the excitation radiation into the fertilized bird egg and receiving the fluorescence radiation from the fertilized bird egg;
wherein
the spectroscopic apparatus is a device for analyzing fluorescence radiation in a temporally-resolved or temporally- and spectrally-resolved manner, wherein the spectroscopic apparatus is configured to measure, at a plurality of equidistantly increasing times for each of one or more wavelengths, a respective value of the fluorescent radiation, the measured values corresponding to a matrix object; and
the measuring head comprises a light guide system with a head end for emitting the excitation radiation and receiving the fluorescence radiation, wherein the light guide system is a Y-shaped light guide system having two light guide strands which are brought together on a side of the head end.

2. The device according to claim 1, wherein the evaluation unit is an evaluation unit based on machine learning.

3. The device according to claim 1, wherein the evaluation unit is an evaluation unit based on feature engineering.

4. A measuring head for a device according to claim 1, which is designed for jointly emitting excitation radiation into the fertilized bird egg and receiving fluorescence radiation from the fertilized bird egg,
wherein the measuring head comprises a light guide system with a head end for emitting the excitation radiation and receiving the fluorescence radiation.

5. A method for in-ovo determination of the sex of a fertilized bird egg, comprising the steps of:
emitting excitation radiation for exciting fluorescence in a region inside the fertilized bird egg by means of a light source;
analyzing fluorescence radiation emitted from the region inside the fertilized bird egg by means of a spectroscopic apparatus in a temporally- and/or spectrally-resolved manner; and
determining the sex from the data obtained by the spectroscopic apparatus,
wherein by means of a measuring head the excitation radiation is emitted into the fertilized bird egg and jointly therewith the fluorescence radiation is received from the fertilized bird egg,
wherein
the spectroscopic apparatus is a device for analyzing fluorescence radiation in a temporally-resolved or temporally- and spectrally-resolved manner, wherein the spectroscopic apparatus is configured to measure, at a plurality of equidistantly increasing times for each of one or more wavelengths, a respective value of the fluorescent radiation, the measured values corresponding to a matrix object; and
the measuring head comprises a light guide system and the emission of the excitation radiation into the fertilized bird egg and the reception of the fluorescence radiation from the fertilized bird egg is effected via a head end of the light guide system which is brought close to the fertilized bird egg, wherein the light guide system is a Y-shaped light guide system having two light guide strands which are brought together on a side of the head end.

6. The method according to claim 5, wherein by means of the measuring head the excitation radiation is emitted into the fertilized bird egg and jointly therewith the fluorescence radiation is received from the fertilized bird egg through a single hole in an eggshell of the fertilized bird egg.

7. The method according to claim 6, wherein the preceding step is of:
forming the hole in the eggshell without opening an egg skin underlying the eggshell.

8. The method according to claim 5, wherein the region inside the fertilized bird egg is a germinal disc region and/or a bloodstream region and/or an region of embryonic structures.

* * * * *